United States Patent Office 3,138,640
Patented June 23, 1964

---

3,138,640
ALICYCLIC OXYANILINES
Gene R. Wilder, St. Albans, W. Va., assignor to Monsanto Company, a corporation of Delaware
No Drawing. Original application Feb. 16, 1959, Ser. No. 793,270, now Patent No. 3,061,585, dated Oct. 30, 1962. Divided and this application June 21, 1961, Ser. No. 128,285
4 Claims. (Cl. 260—571)

This invention relates to the preservation of a rubber. More particularly it relates to the preservation of a rubber with a new class of rubber antidegradants and to rubber vulcanizates containing them.

This is a division of Serial No. 793,270, filed February 16, 1959, now U.S. Patent No. 3,061,585, issued October 30, 1962.

Deterioration of rubber due to aging is a well-defined problem. The degradation is manifested in the case of natural rubber by loss of tensile strength and it is usually attributed to absorption of oxygen. It has long been known that such deterioration can be greatly retarded by treating the rubber with substances known as age resisters or antioxidants.

Other deterioration which can take place in rubber is that caused by the small quantities of ozone usually present in the atmosphere. The particular effect which ozone has on rubber is that it is largely responsible for the surface cracking which can occur when rubber is subjected to distortion or extension.

The flexing of rubber, such as that which takes place in the sidewalls of a tire, causes the formation of cracks in the rubber. These cracks may ultimately cause failure of the tire sidewall. Compounding ingredients useful for reducing the formation of cracks on flexing are known as antiflex cracking agents.

To protect rubber against the action of oxygen and ozone and to improve the flex life of a rubber, various substances have been proposed. However, in general age resisters or antioxidants have little or no value in protecting vulcanizates against deterioration by ozone. A rubber chemical which does combine both functions is conveniently termed an antidegradant. A good antidegradant may still suffer from the disadvantage that it may cause darkening with time and badly discolor a rubber stock in which it is incorporated if it should be of a light color. This problem does not arise with dark colored stocks obtained using carbon blacks, for instance, but it is a serious difficulty in such compositions as the white rubber stocks obtained using zinc oxide, titanium dioxide and analogous substances. Also, some good antiflex cracking agents are not suitable for use in white sidewalls because of their tendency to discolor.

In accordance with the present invention a new class of compounds has been discovered which are very effective antidegradants as well as antiflex cracking agents and they do not seriously discolor light-colored rubber stocks. This new class of substituted anilines has the formula:

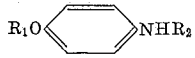

where $R_1$ and $R_2$ are alicyclic groups, or a salt of one of these substituted anilines. $R_1$ and $R_2$ may be the same or different and are represented by cyclohexyl or cyclopentyl and alkyl substituted derivatives thereof, notably methyl, ethyl, propyl, isopropyl, butyl and amyl groups.

Preferably the substituted aniline has at least one position ortho-to the amino group that is vacant, but this is not an essential requirement and in general an inactive substituent or substituents can be present anywhere in the benzene ring. The inactive substituent can, for example, be a hydrocarbon group, particularly for instance an alkyl group such as a methyl, ethyl or propyl group. Examples of alkyl substituted derivatives of this type are N-cyclohexyl-2-methyl-4-cyclohexyloxyaniline and N-cyclopentyl-2,6-dimethyl-4-cyclopentyloxyaniline.

Salts of the substituted anilines which can be used are the acid-addition salts formed by treating the free base with an acid such as hydrochloric acid, or for instance an organic acid such as acetic or stearic acid. Also suitable are the quaternary ammonium salts, such as the quaternary chlorides obtained by treating the free base with an alkyl chloride. Further examples of substituted anilines from which such derivatives may be prepared or which may be used in free base form comprise N-1-methylcyclohexyl-p-cyclopentyloxyaniline, N-cyclohexyl-p-cyclopentyloxyaniline, N-cyclohexyl-p-cyclohexyloxyaniline, N-(2-methylcyclohexyl)-p-cyclohexyloxyaniline, N-cyclohexyl-p-(1-methylcyclohexyloxy)aniline, N-cyclopentyl-p-cyclohexyloxyaniline and N-cyclohexyl-p-(2-methylcyclohexyloxy)aniline.

The substituted anilines of this invention may be obtained by subjecting the appropriate alicyclicoxyaniline and alicyclic ketone to condensation and reduction. When the two steps are combined into one continuous reaction in the presence of hydrogen and a hydrogenation catalyst the process is called "reductive alkylation." Appropriate alicyclicoxyanilines useful as intermediates have been described particularly in the cyclohexyloxyaniline series. Cyclopentyloxyaniline does not appear to be known and the invention will be illustrated with a detailed description of an antidegradant prepared from cyclopentyloxyaniline including preparation of this intermediate and the functioning of the final product in a rubber stock. It will be appreciated that other members of the class disclosed may be used as antidegradants with similar results.

EXAMPLE 1

Into a 3 liter, 3-neck flask equipped with thermometer, water-cooled reflux condenser, stirrer and loading funnel was charged 940 cc. of dimethyl formamide, 468 grams (3.36 moles) of p-nitrophenol and 3.38 moles of potassium hydroxide pellets. While forming the potassium nitrophenate a water bath was used to hold the exothermic reaction between 30–40° C. The suspension of potassium nitrophenate in the dimethyl formamide was rapidly stirred and heated at 90° C. while 510 grams (3.42 moles) of cyclopentyl bromide was added dropwise over a period of 30 minutes. Very little external heat was needed to maintain the temperature at 90–96° C. The slurry was then digested at 100–105° C. for 2 hours under reflux, cooled to 30° C. and 940 cc. of 10% sodium hydroxide solution and 940 cc. of water then stirred into it. The batch was transferred to a separatory funnel and the upper or product layer separated. The bottom layer was washed twice with 1000 cc. portions of benzene and then with one 500 cc. portion. The combined product and benzene layers were washed first with 1000 cc. of 10% sodium hydroxide and then with two 1000 cc. portions of water. The benzene was stripped off by distillation in vacuo to a pot temperature of 100° C./30 mm. The p-cyclopentyloxynitrobenzene was a clear yellow, highly refractive liquid, B. P. 153° C./2 mm. It crystallized upon cooling. The yield was 58.0%. Reduction of p-cyclopentyloxynitrobenzene with hydrogen employing palladium on carbon yielded p-cyclopentyloxyaniline, B.P. 153–155° C./7 mm.

To a glass or glass-lined reactor fitted with a thermometer, stirrer, water trap, condenser and outlet to vacuum pump was added 100 grams (0.56 mole) of the p-cyclopentyloxyaniline thus prepared and 200 grams (2.0 moles) of cyclohexanone. The mixture was heated under vacuum to about 95–100° C. and the pressure of the system reduced to induce refluxing at this temperature. The condensate consisted of an azeotrope mixture of cyclohexanone and water. The reaction was continued until the theoretical quantity of water had been collected in the trap. The excess cyclohexanone was then distilled from the reaction mixture under reduced pressure, 150 grams of isopropanol added and the solution transferred to an autoclave together with 5 grams of a catalyst composed of carbon on which was supported 5% by weight of platinum. The autoclave was purged twice with hydrogen and the contents heated to 105° C. under hydrogen pressure of about 500 pounds per square inch. Absorption of hydrogen took place at 105° C. for about one-half hour. The reaction was then cooled and the contents filtered to remove the catalyst. The solvent was removed by distillation. Distillation of the residue gave a 63% yield of N-cyclohexyl-p-cyclopentyloxyaniline, B.P. 200–205° C./5 mm. which product solidified on standing. Crystallization from petroleum ether gave 67 grams of white lustrous plates which melted at 45–46° C.

To demonstrate the protection afforded to a white rubber stock and resistance to discoloration, the following stock was compounded:

| | Parts by weight |
|---|---|
| Pale crepe rubber | 100.0 |
| Zinc oxide | 25.0 |
| Titanium dioxide | 50.0 |
| Clay | 15.0 |
| Sulfur | 3.0 |
| Stearic acid | 1.0 |
| 2,2'-dithiobis benzothiazole | 0.6 |
| Diphenylguanidine | 0.15 |

The stock was first made up without any addition, and then with the addition of 1.5 parts of antidegradant. The two stocks were vulcanized in the usual manner by heating in a press at 144° C. for 30 and 45 minutes. The first column of data in Table I shows the percent retention of ultimate tensile strength after aging 7 hours in an air bomb at 121° C. under 80 pounds air pressure per square inch. The figures are for the optimum cures. The second column shows the percent retention of ultimate tensile strength after heat aging 96 hours by the test tube method. This test was run in accordance with A.S.T.M. D865–54T.

Table II records the resistance to discoloration as compared to the same base stock containing a standard commercial phenolic antioxidant resistant to discoloration. Samples of the vulcanizates were exposed for 72 hours in a Fadeometer. A carbon arc supplied the light. The percentages of light reflected from the surfaces of the samples after exposure are recorded.

Table I

| Antidegradant | Percent Retention of Ultimate Tensile Strength | |
|---|---|---|
| | After aging 7 Hrs. in Air Bomb | After aging 96 Hrs. Test Tube Method |
| None | 20 | 23 |
| N-Cyclohexyl-p-cyclopentyloxyaniline | 60 | 72 |

Table II

| Antidegradant: | Percent Reflectivity After 72 Hours in a Fadeometer |
|---|---|
| Commercial phenolic antioxidant | 72 |
| N-cyclohexyl-p-cyclopentyloxyaniline | 75 |

The above data illustrate the effectiveness of the new class of substituted anilines against oxygen degradation and discoloration of a light colored rubber stock.

In manufacture of rubber goods in which the product comes in contact with lacquered surfaces it is necessary to avoid ingredients which migrate and stain the lacquer during service. The antidegradants of this invention have litttle tendency to migrate from the rubber into the lacquer surface and are sufficiently non-staining to meet requirements for use in contact with nitrocellulose lacquers.

To demonstrate the anti-exposure cracking properties of the preferred compounds portions of the 45 minute cures were exposed to ozone and the surface condition after exposure recorded. Since evaluation under static conditions is not indicative of the service obtained with many types of rubber articles which must withstand flexing, the vulcanized compositions were evaluated under dynamic conditions in an atmosphere containing a definite concentration of ozone. The test is carried out in the following manner: Samples of the stocks are cured in the form of a belt ½" wide, ¼" thick and 5%6" in diameter and mounted on 1" diameter shafts. The ozone concentration is maintained at 20–30 parts per hundred million throughout the test and the shafts are rotated at 75 r.p.m. In this manner a momentary elongation through a range of 0–20% was provided at any portion of the test specimen passing over the shaft. (The apparatus and procedure employed is described by Creed et al. in Analytical Chemistry, vol. 25, page 241, February 1953.) The experimental test specimens were compared visually at various intervals, noting the extent of cracking. A stock which is severely cracked has no service life remaining in terms of the useful life of a rubber article and where the cracking is designated as very severe the degradation is well beyond even this point. The results are set forth in Table III. Stock A is the untreated control and Stock B contains 1.5 parts of N-cyclohexyl-p-cyclopentyloxyaniline.

Table III

| Stock | 24 Hrs. | 32 Hrs. | 48 Hrs. | 56 Hrs. | 72 Hrs. | 80 Hrs. |
|---|---|---|---|---|---|---|
| A | v. slight | slight | moderate | moderate | severe | v. severe. |
| B | none | none | none | none | v. slight | v. slight. |

Another advantage of the compounds of this invention is demonstrated by stress relaxation under constant load. The quantity measured is change in strain. In this test, known as measurement of creep, rubber samples are subjected to a stress of 45 pounds per square inch cross sectional area and the time required for the sample to stretch 20% of its original length in air at 100° C. is recorded. Results of the test are set forth in the first column of Table IV. The second column shows the resistance to flex cracking after aging 96 hours at 100° C. in an oven. The figures recorded are kilocycles to failure on a Firestone flexing machine.

Table IV

| Antidegradant | Hrs. for 20% Elongation at 100° C. in Air | Firestone Flexing Kilocycles to Failure after Aging 96 Hrs. |
|---|---|---|
| None | 9 | 32 |
| N-Cyclohexyl-p-cyclopentyl-oxyaniline | 36 | 176 |
| N-Cyclohexyl-p-phenetidine | 14 | 121 |

The substituted anilines of this invention are effective for diene hydrocarbon rubbers. They are substantially non-discoloring and may be used to advantage in any rubber composition, whether of natural rubber or of a synthetic rubber-like polymer or copolymer, as for example butadiene-1,3-styrene copolymer rubber.

The amount of the substituted aniline used in the rubber can vary between wide limits, but in general it has been found preferable to use from 0.2 to 3 parts by weight, and particularly from 0.5 to 2 parts by weight, per hundred parts by weight of rubber used. Amounts somewhat outside these limits can sometimes be employed, for instance from 0.1 to 5 parts of the compound per hundred parts of rubber. Very satisfactory results have been obtained using about 1 part by weight of the substituted aniline per hundred parts by weight of rubber.

It is intended to cover all changes and modifications of the examples of the invention herein chosen for purposes of disclosure which do not constitute departures from the spirit and scope of the invention.

What is claimed is:

1. A compound of the structure

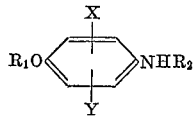

where $R_1$ and $R_2$ are selected from a group consisting of cyclohexyl, cyclopentyl, alkylcyclohexyl containing 1-5 carbon atoms in the alkyl group and alkylcyclopentyl containing 1-5 carbon atoms in the alkyl group and X and Y are members of a group consisting of hydrogen and lower alkyl containing 1-3 carbon atoms.

2. A compound of the structure

where $R_1$ and $R_2$ are cycloalkyl groups of the formula

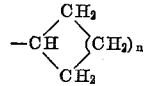

where $n$ is an integer at least 2 but not more than 3.

3. N-cyclohexyl-p-cyclopentyloxyaniline.
4. N-cyclohexyl-p-cyclohexyloxyaniline.

References Cited in the file of this patent

UNITED STATES PATENTS

| | | |
|---|---|---|
| 2,300,246 | Chenicek et al. | Oct. 27, 1942 |
| 2,666,791 | Weinmayr | Jan. 19, 1954 |